US006851526B2

(12) United States Patent
Ore

(10) Patent No.: US 6,851,526 B2
(45) Date of Patent: Feb. 8, 2005

(54) ACTUATOR ASSEMBLY

(75) Inventor: Thomas George Ore, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 15 days.

(21) Appl. No.: 10/302,162

(22) Filed: Nov. 20, 2002

(65) Prior Publication Data

US 2004/0094374 A1 May 20, 2004

(51) Int. Cl.$^7$ ............................................. F16D 65/24
(52) U.S. Cl. ..................................... 188/170; 188/72.3
(58) Field of Search ................................ 188/71.4, 166, 188/170, 72.1, 72.3; 192/91 R, 91 A, 66.22

(56) References Cited

U.S. PATENT DOCUMENTS

| | | | | |
|---|---|---|---|---|
| 3,145,816 A | * | 8/1964 | De Lorean et al. | 192/91 R |
| 3,773,152 A | * | 11/1973 | Sitton | 188/170 |
| 4,252,208 A | * | 2/1981 | Heidemeyer et al. | 192/91 A |
| 4,657,127 A | * | 4/1987 | Boffelli | 192/91 A |
| 4,947,966 A | * | 8/1990 | Huff | 188/170 |
| 5,035,305 A | * | 7/1991 | Lammers | 188/170 |
| 5,186,284 A | * | 2/1993 | Lamela et al. | 188/170 |
| 5,253,737 A | * | 10/1993 | Klaue | 188/170 |
| 5,873,443 A | * | 2/1999 | Meller et al. | 188/170 |

FOREIGN PATENT DOCUMENTS

JP 2000-136833 A * 5/2000

OTHER PUBLICATIONS

Deere & Co., "Assembly Line Parts—Park Brake", Aug. 2001.
Deere & Co., "Park Brake for 8000 PST", date unknown.

* cited by examiner

Primary Examiner—Jack Lavinder
Assistant Examiner—Thomas Williams

(57) ABSTRACT

A actuator for a brake ort clutch includes a support member which has a flange projecting radially therefrom. An annular piston is slidably and sealingly mounted on the support member on one side of the flange. A pair of disk springs are mounted on the support member on the other side of the flange. A hollow brake-engaging member surrounds the flange, the piston and the disk springs. A first end of the brake-engaging member is coupled to the piston. A second end of the brake-engaging member is coupled to the disk springs and is adapted to engage a wheel brake. The flange, support member, piston and brake-engaging member enclosing a piston chamber. The disk springs are biased to urge the second end of the brake-engaging member away from the flange. Fluid pressure in the piston chamber urges the second end towards the flange.

7 Claims, 2 Drawing Sheets

ACTUATOR ASSEMBLY

BACKGROUND

The present invention relates to a actuator assembly, such as for a parking brake of a vehicle.

Spring applied, pressure released parking brake actuators are well known and are available in a variety of designs. However, such mechanisms require a certain amount of space and it would be desirable to have a compact assembly.

SUMMARY

Accordingly, an object of this invention is to provide a compact actuator assembly.

These and other objects are achieved by the present invention, wherein a brake actuator includes a support member which has a flange projecting radially therefrom. An annular piston 22 is slidably and sealingly mounted on the support member on one side of the flange. Two or more disk springs are mounted on the support member on the other side of the flange. A hollow brake-engaging member surrounds the flange, the piston and the disk springs. A first end of the brake-engaging member is coupled to the piston. A second end of the brake-engaging member is coupled to the disk springs and is adapted to engage a wheel brake. The flange, support member, piston and brake-engaging member enclose a piston chamber. The disk springs are biased to urge the second end of the brake-engaging member away from the flange. Fluid pressure in the piston chamber urges the second end towards the flange. A plurality of fingers project outwardly from an outer edge of one of the disk springs. The second end of the brake-engaging member forms a plurality of peripherally spaced apart tabs which receive and hold a snap ring. The snap ring engages the fingers of the disk spring.

DETAILED DESCRIPTION

Figure 1:
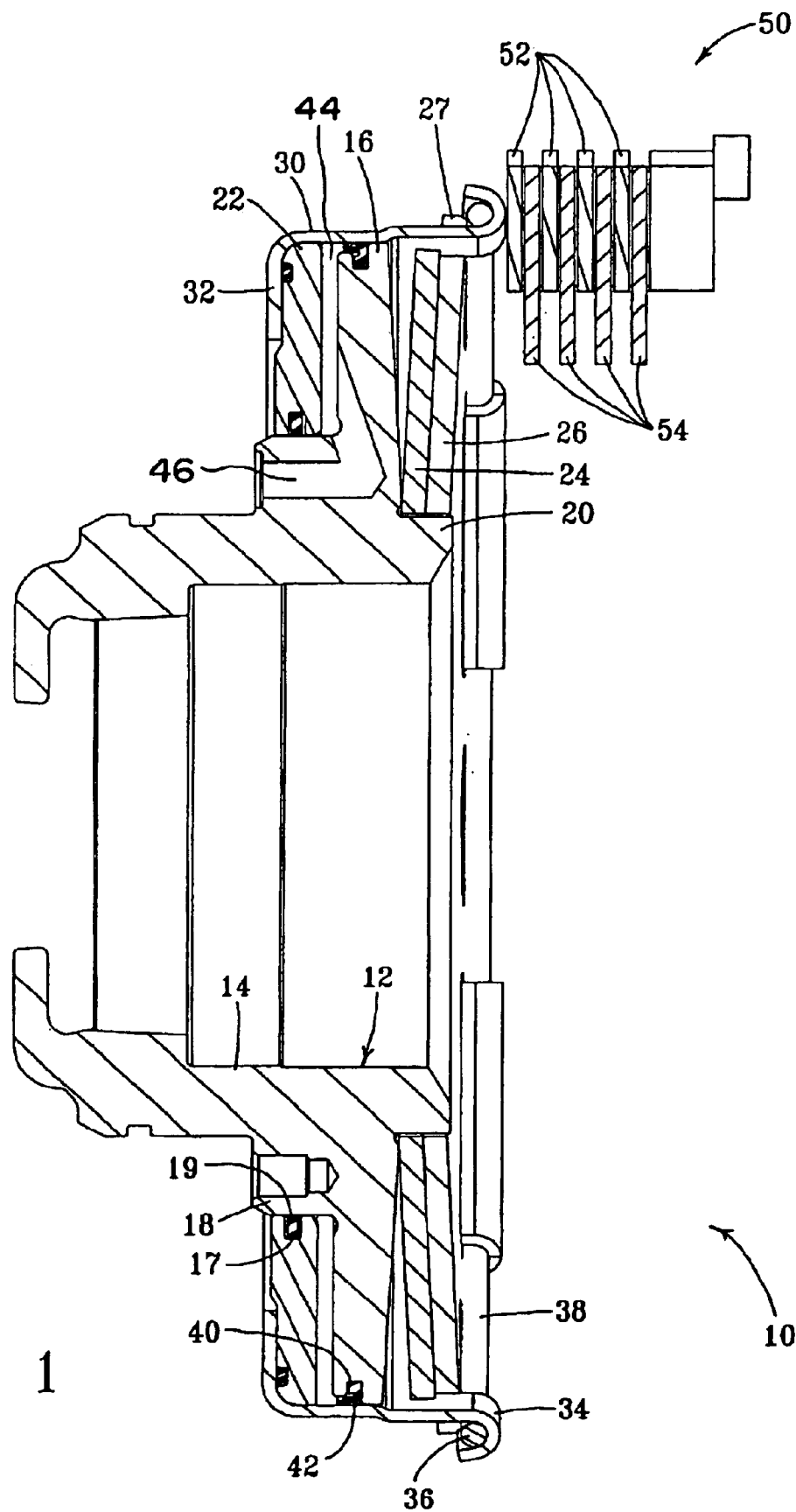
FIG. 1 is a sectional view of an actuator according to the present invention.
Figure 2:
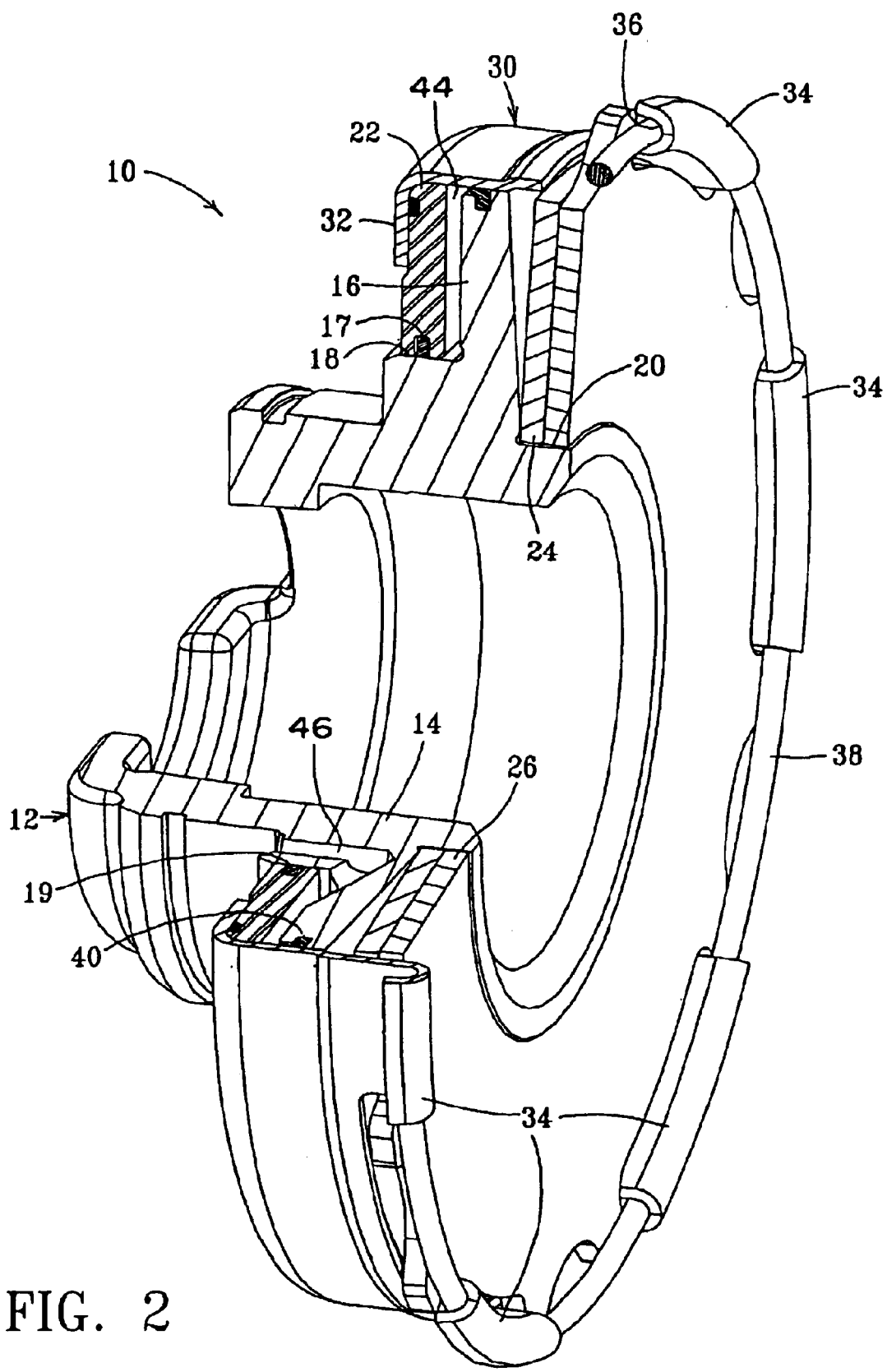
FIG. 2 is a perspective view of the actuator of FIG. 1 with a portion cut away for clarity.

Referring to FIGS. 1 and 2, the actuator 10 includes a hollow generally cylindrical support member 12. Member 12 has a central hollow hub 14 affixed to a stationary housing (not shown). A flange 16 projects radially from hub 14 and is located between a larger diameter hub portion 18 and a smaller diameter hub portion 20. An annular piston 22 is slidably and sealingly mounted on the hub portion 18 adjacent to the flange 16. A groove 17 in the piston 22 receives an annular seal 19 which sealingly engages the outer surface of hub portion 18.

A pair of disk springs 24 and 26 are mounted on hub portion 20. A plurality of fingers 27 project outwardly from the outer edge of disk spring 26. An outer hollow annular substantially bowl-shaped piston or brake engaging member 30 surrounds the flange 16, piston 22 and disk springs 24 and 26. Member 30 includes an annular flange 32 which projects radially inwardly from one end of member 30 and engages a radially outer portion of an outer side surface of piston 22. The other end of member 30 forms a plurality of peripherally spaced apart tabs 34 which are curved in a reverse C-shaped manner, viewing FIG. 1. Tabs 34 form recesses 36 which receive a snap ring 38. Snap ring 38 engages fingers 27 of disk spring 26 to thereby retain disk springs 24 and 26 on the hub portion 20. An outer annular groove 40 in the flange 16 receives an annular seal 42 which engages an inner surface of member 30. Flange 16, hub portion 18, piston 22 and member 30 enclose an annular piston chamber 44. A fluid passage 46 is formed in the hub 14 for communicating a controlled source of fluid pressure (not shown) to chamber 44.

As best seen in FIG. 1, springs 24 and 26 are biased to urge the tabs 34 away from flange 16 and into a friction plate assembly 50 which is operatively coupled to a vehicle wheel (not shown). Friction plate assembly 50 includes a set of rotationally fixed friction plates 52 and a set of friction plates 54 which rotate with the wheel (not shown). As a result, the friction plate assembly 50 is normally spring-applied by the actuator assembly 10. When chamber 44 is pressurized, piston 22, member 30 and tabs 34 all move to the left and away from friction plate assembly 50. As a result, friction plate assembly 50 may be pressure-released by the actuator assembly 10.

While the present invention has been described in conjunction with a specific embodiment, it is understood that many alternatives, modifications and variations will be apparent to those skilled in the art in light of the foregoing description. For example, this mechanism could also be used as a clutch in low speed applications. Accordingly, this invention is intended to embrace all such alternatives, modifications and variations which fall within the spirit and scope of the appended claims.

I claim:

1. An actuator, comprising:
a support member having a flange projecting radially therefrom;
an annular piston is slidably and sealingly mounted on the support member; a disk spring mounted on the support member, the flange being located between the piston and the disk spring, a plurality of fingers projecting outwardly from an outer edge of the disk spring;
a hollow brake-engaging member surrounding the flange, the piston and the disk spring, a first end of the brake-engaging member being coupled to the piston, a second end of the brake-engaging member being coupled to the disk spring and being adapted to engage a wheel brake, the flange, support member, piston and brake-engaging member enclosing a piston chamber, the disk spring being biased to urge the second end of the brake-engaging member away from the flange, and fluid pressure in the piston chamber urging said second end towards the flange, the second end of the brake-engaging member forming a plurality of peripherally spaced apart tabs; and
a snap ring held by the tabs, the snap ring engaging the fingers and retaining the disk spring in the actuator.

2. The actuator of claim 1, wherein:
the support member includes a central hollow hub adapted for receiving an axle.

3. The actuator of claim 1, wherein:
the tabs form recesses which receive the snap ring.

4. The actuator of claim 1, wherein:
an annular groove is formed in an outer surface of the flange and an annular seal is mounted in the groove and engages an inner surface of the brake-engaging member.

5. The actuator of claim 1, wherein:
a fluid passage is formed in the support member for communicating pressurized fluid to the piston chamber.

6. The actuator of claim 1, wherein:

an annular groove is formed in an inner surface of the piston, and an annular seal is mounted in the groove and engages an outer surface of the support member.

7. An actuator, comprising:

a support member having a flange projecting radially therefrom;

an annular piston is slidably and sealingly mounted on the support member;

a disk spring mounted on the support member, the flange being located between the piston and the disk spring, the disk spring forming a plurality of fingers projecting radially outwardly therefrom;

a hollow brake-engaging member surrounding the flange, the piston and the disk spring, the brake-engaging member slidably engaging the flange, a first end of the brake-engaging member being coupled to the piston, a second end of the brake-engaging member being coupled to the disk spring and being adapted to engage a wheel brake, the flange, support member, piston and brake-engaging member enclosing a piston chamber, the disk spring being biased to urge the second end of the brake-engaging member away from the flange, and fluid pressure in the piston chamber urging said second end towards the flange; and a retaining member coupled to the second end of the brake-engaging member, the retaining member engaging the fingers and retaining the disk spring in the actuator.

* * * * *